United States Patent [19]

Jones

[11] Patent Number: 5,525,672
[45] Date of Patent: Jun. 11, 1996

[54] ADHESIVE BLENDS OF MODIFIED ANHYDRIDE-GRAFTED POLYOLEFINS

[75] Inventor: Jeffrey A. Jones, Morrow, Ohio

[73] Assignee: Quantum Chemical Corporation, Cincinnati, Ohio

[21] Appl. No.: 296,290

[22] Filed: Aug. 25, 1994

Related U.S. Application Data

[62] Division of Ser. No. 53,053, Apr. 26, 1993, abandoned, which is a continuation of Ser. No. 841,112, Feb. 25, 1992, abandoned.

[51] Int. Cl.$^6$ .................................................... C08L 51/06
[52] U.S. Cl. ................................................. 525/80; 525/74
[58] Field of Search ........................... 525/80, 85, 75, 525/74

[56] References Cited

U.S. PATENT DOCUMENTS

| | | |
|---|---|---|
| 2,599,119 | 6/1952 | McQueen . |
| 2,599,123 | 6/1952 | Pinkney et al. . |
| 3,972,961 | 8/1976 | Hammer et al. . |
| 4,198,327 | 4/1980 | Matsumoto ................... 525/80 |
| 4,225,476 | 9/1980 | Hammer et al. . |
| 4,237,037 | 12/1980 | Takahashi ..................... 525/80 |
| 4,347,341 | 8/1982 | Bartl et al. . |
| 4,670,516 | 6/1987 | Sackmann . |
| 4,727,120 | 2/1988 | Nogues . |
| 4,812,513 | 3/1989 | Hirose . |
| 5,064,897 | 11/1991 | Tazi et al. . |

FOREIGN PATENT DOCUMENTS

| | | |
|---|---|---|
| 0188901 | 7/1986 | European Pat. Off. . |
| 1055337 | 1/1967 | United Kingdom . |
| 2116187 | 9/1983 | United Kingdom . |

OTHER PUBLICATIONS

Ushakov, S. N., et al., *Journal of Applied Chemistry USSR*—Translation of *Zhurnal Prikladnoi Khimii* 24, pp. 319–325 (1951).

*Primary Examiner*—Christopher Henderson
*Attorney, Agent, or Firm*—Gerald A. Baracka; William A. Heidrich

[57] ABSTRACT

Anhydride-functionalized polymers are modified in accordance with the present invention by reacting all or a portion of the anhydride functionality with an aliphatic alcohol to convert the anhydride groups to half-esters. Half-esters produced by modifying maleic anhydride grafted ethylene polymers with alcohols are particularly useful. Adhesive blends obtained by combining the alcohol-modified polymers with one or more polyolefin base resins and composite structures wherein said adhesive blends are adhered to EVOH are also provided. Modification of the maleic anhydride grafts in accordance with the process of this invention makes it possible to produce films having improved optical quality.

6 Claims, No Drawings

ADHESIVE BLENDS OF MODIFIED ANHYDRIDE-GRAFTED POLYOLEFINS

CROSS REFERENCE TO RELATED APPLICATIONS

This is a divisional of application Ser. No. 08/053,053, filed Apr. 26, 1993, now abandoned, which is a continuation of application Ser. No. 07/841,112 filed Feb. 25, 1992, now abandoned.

BACKGROUND OF THE INVENTION

1. Field of the Invention

The present invention relates to an improvement in the production of anhydride-functionalized polymers useful as adhesives for bonding various resin substrates. More specifically, the invention relates to the modification of polymers grafted with maleic anhydride which are used as adhesives for multi-layer film constructions wherein one or more of the resin layers is an EVOH resin. The improvement consists of reacting the grafted anhydride functionality with an alcohol, up to one equivalent alcohol per equivalent of anhydride, to improve the optical quality of films produced using the resulting product.

2. Description of the Prior Art

Multi-layer film products wherein one or more of the resin layers is a polyolefin and one or more of the remaining resin layers is a homopolymer or copolymer of vinyl alcohol are widely utilized by the packaging industry where moisture and oxygen barrier properties are required. Both of these resins are coextrudable and well-suited for the construction of multi-layer films. The polyolefin in the structure provides a high degree of impermeability to water vapor and resistance to chemicals while the vinyl alcohol resin supplies the deficiency of the polyolefin with regard to the permeability of oxygen and other gases. Vinyl alcohol polymers are well-known for their low gas permeability and ethylene-vinyl alcohol (EVOH) copolymers are particularly useful in view of their ready coextrudability. One or more other resin layers e.g. polyamide, ethylene-vinyl acetate (EVA) copolymer, polyester or polyvinylidene chloride, may also be included in the construction to impart other desirable characteristics to the film.

Since vinyl alcohol polymers do not adhere well to several of the more commonly used resins, most notably polyolefins and EVA copolymers, an interlayer of adhesive material which exhibits good adhesion to both resin substrates is generally coextruded between them. This adhesive material, sometimes referred to as the "tie-layer", makes it possible to obtain a multi-layer film which has high resistance to the passage of gases and moisture and wherein the layers are resistant to delamination. Such multi-layer film products are well adapted for use as packaging materials for both food and non-food products which require durable moisture and oxygen barrier packaging.

Modified polyolefins are extensively utilized as the interlayer material. Most commonly, the modified polyolefin is a polyethylene or polypropylene resin which has been modified by grafting with an unsaturated fused-ring carboxylic acid anhydride, e.g., maleic anhydride. These grafted polymers are typically blended with one or more other polymers to achieve the desired balance of properties. A variety of high performance adhesives for coextrusion and metal bonding which incorporate anhydride-functionalized polyolefins are manufactured by Quantum Chemical Corporation and sold under the PLEXAR trademark.

Even though coextruded films with acceptable levels of adhesion can be produced using the anhydride-functionalized polyolefin blends, in some cases there may be a corresponding decrease in the optical qualities of the resulting multi-layer film structure. In severe cases, the film is hazy or cloudy which is, of course, objectionable to users who desire clear, water-white film to display their packaged goods. While the optical quality of most films can be brought up to acceptable levels by judicious selection and control of process conditions, such as by controlling temperature of polymer melt(s), varying the length of time the resin melts are in contact and the rate of cooling, it is not always possible in commercial operations to vary these parameters to the extent necessary due to equipment limitations and the adverse affect these changes can have on other properties. For example, while decreasing the melt temperature of the polymers can improve the optical quality of the resulting film, it reduces adhesion. Similarly, decreasing the length of time which the molten adhesive blend is in contact with the polymer melt improves optical clarity but lowers adhesion values. Cost and manufacturing considerations must also be taken into account so that even though optical quality and adhesion can be increased by reducing the cooling rate of the film as it exits the extruder, this is generally not an acceptable approach for commercial operations where high line speeds are essential.

For the coextrusion of EVOH or other vinyl alcohol resins it is therefore most desirable to employ adhesive blends which can be used in existing coextrusion operations without significantly changing operating conditions or equipment design. To this end, it would be advantageous if the anhydride-functionalized polymers utilized for these adhesive blends and which are known to adversely affect the optical quality of films formed therewith could be modified to eliminate or substantially reduce the problem. It would be even more advantageous if this could be accomplished without any reduction in adhesion.

It is generally accepted within the industry that the optical quality of a coextruded multi-layer film is not determined by a single property. Rather, optical quality is determined by a balance of several properties, namely gloss, haze and transparency. Gloss is a measure of the shiny appearance of the film surface whereas haze relates to the light-transmitting ability of the film. Transparency is a measure of the ability to "see through" the film without distorting relatively distant objects. Whereas gloss and haze are generally considered to result from the bulk properties of resins used, poor transparency is in many cases believed to result from an interfacial phenomenon sometimes referred to as "interfacial instability." It is possible for films to have good values for two of these properties and yet be unacceptable due to a deficiency of the remaining property. For example, a film may have acceptable gloss and haze and yet be unacceptable to a manufacturer due to its poor transparency. A balance must be struck between these three properties and no one of the properties may fall below its minimum acceptable limit if a film is to be considered truly acceptable.

Since the use of various anhydride-functionalized polymers has been observed to detract from the transparency of coextruded multi-layer EVOH films, it would be highly desirable if anhydride-functionalized polymers which yield significantly improved transparency could be produced. It would be particularly advantageous if these improved polymers did not detract from the adhesive properties or the gloss and haze properties of the film. These and other advantages are realized by the modified anhydride-functionalized polymers produced by the process of the present invention.

SUMMARY OF THE INVENTION

A process has now been discovered for obtaining improved anhydride-functionalized polymers which comprises reacting an anhydride-functionalized polymer with up to one equivalent of an aliphatic alcohol to convert all or a portion of the anhydride functionality to the half-ester. The equivalents ratio of alcohol to anhydride and the reaction conditions will determine how much of the anhydride will be converted to half-ester. Quite unexpectedly it has been discovered that coextruded EVOH films produced using adhesive blends based on the anhydride-functionalized half-ester products modified in this manner have a significantly improved balance of optical properties. The transparency of these films is markedly superior to those produced using the unmodified anhydride-functionalized product and, surprisingly, products produced by directly grafting maleic half-ester onto a polyolefin backbone.

The modified anhydride-functionalized polymers are obtained by reacting a polyolefin grafted with from 0.1 to 5 weight percent maleic anhydride with up to 1 equivalent of aliphatic alcohol having from 1 to 10 carbon atoms. More preferably, the polyolefin is an ethylene homo- or copolymer grafted with 0.2 to 3 weight percent maleic anhydride and subsequently reacted with 0.4 to 1.0 equivalents $C_{3-8}$ aliphatic alcohol. Adhesive blends are obtained by combining 0.1 to 30 weight percent of the modified anhydride functionalized polymer with 70 to 99.9 weight percent of an ethylene polymer selected from the group consisting of ethylene homopolymers, copolymers of ethylene and $C_{3-8}$ olefins and ethylene-ester copolymers. The adhesive blends will have melt indexes from 0.1 up to about 20. Ethylene-vinyl acetate and ethylene-n-butyl acrylate copolymer are especially advantageous base resins for these blends particularly when the modified anhydride-functionalized polymer is HDPE grafted with about 0.2 to 3 weight percent maleic anhydride and reacted with 0.4 to 1.0 equivalents aliphatic alcohol having from 2 to 8 carbon atoms.

The adhesive blends are employed for composite structures comprised of multiple layers wherein one or more of said layers is EVOH having the above-described adhesive blends adhered thereto. These composite structures are typically comprised of one or more additional layers selected from nylon, polyvinyl alcohol, polyester, polyurethane, low density polyethylene, linear low density polyethylene, high density polyethylene, ethylene-vinyl acetate copolymer, paper and aluminum.

DETAILED DESCRIPTION OF THE INVENTION

The present invention is directed to a process whereby improved anhydride-functionalized polymers, most notably, polyolefins grafted with maleic anhydride, are produced. For the improvement, the anhydride-functionalized polymer is modified by reacting with an aliphatic alcohol under conditions which convert all or a portion of the anhydride groups to the corresponding half-ester. It has quite unexpectedly been found that by such conversion it is possible to significantly improve the optical quality of the functionalized polymer, and adhesive blends prepared therewith, without detracting from the adhesive properties. The transparency of films produced using the modified products of the invention is markedly superior to that obtained using the unmodified anhydride-functionalized product. While it is known to graft diesters and half-esters of dicarboxylic acids or their anhydrides, such as maleic acid or maleic anhydride, onto various polymer substrates, functionalized polymers obtained by directly grafting a half-ester onto a polymer backbone exhibit substantially poorer transparency than the products of the invention which are produced by modifying previously grafted anhydride functionality.

For the process of this invention, an anhydride-functionalized polymer is reacted with an aliphatic alcohol to convert all or a portion of the grafted anhydride moieties to the corresponding half-ester. Aliphatic alcohols which can be employed will contain from 1 up to about 10 carbon atoms. It is especially useful to utilize aliphatic alcohols containing from 2 to 8 carbon atoms. Illustrative alcohols which can be used include methanol, ethanol, propanol, butanol, hexanol, and 2-ethylhexanol.

All or only a portion of the anhydride moieties present on the polymer backbone may be converted to half-ester. The extent of the conversion will depend on the amount of alcohol used. Where it is desired to convert all of the anhydride functionality, one equivalent alcohol will be reacted per anhydride equivalent. While it is possible to employ as little as 0.1 equivalent alcohol, the amount of alcohol reacted is more typically 0.2 equivalent or above. In a preferred embodiment of the invention alcohol equivalents will range from 1.0 to 0.4.

The reaction of a single anhydride group grafted onto a polyethylene backbone with one equivalent alcohol (ROH) can be illustrated by the following equation:

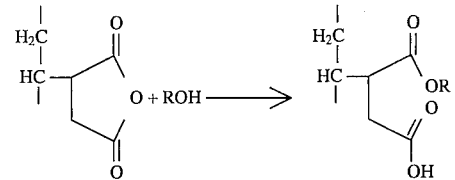

As with the esterification of difunctional acids, it will be evident to those skilled in the art that the above equation represents the "ideal" reaction and that some diester formation cannot be avoided. As the alcohol equivalents is increased within the foregoing recited range, the amount of diester formed will generally increase.

Similarly, there will necessarily be residual anhydride functionality when less than one equivalent alcohol is reacted. Even when one equivalent alcohol is reacted, a small amount of the anhydride will be unreacted and remain in tact.

The reaction of the alcohol and anhydride-functionalized polymer can be carried out using conventional procedures. One such procedure for modifying the polymer capable of continuous operation, is to carry out the reaction in the melt, i.e., at a temperature above the melt point of the polyolefin. This is generally accomplished using a conventional extruder, such as a Warner Pfleiderer ZSK-30 twin screw extruder. For such operation, the anhydride-functionalized polymer is fed at a fixed rate and the alcohol is metered into the extruder at a point downstream of the melt/mixing zone. The amount of alcohol introduced will be determined by the degree of reaction desired. A vacuum can be applied to the system in the final stages of the extrusion. Residence times will vary depending on operating conditions.

The reaction may also be carried out by contacting the alcohol with pellets of the anhydride-functionalized polymer in a suitable mixer, such as a Henschel Mixer. Typically for this type of operation, the polymer pellets are heated at an elevated temperature (but below their melt point) while mixing. Depending on the extent of modification desired, an amount of alcohol is added and the temperature is maintained while mixing. When the reaction is complete, the mixture is cooled and the modified product is recovered in pelletized form.

In yet another type of operation, the reaction is carried out in an inert liquid medium. For this method, the anhydride-functionalized product, in powder or pellet form, is charged to vessel containing the desired amount of alcohol and an organic medium which is not a solvent for the polymer. The organic medium may swell the polymer to some extent but it should not make the polymer sticky. The mixture is then heated at a temperature below the melt point of the polymer with stirring (usually under nitrogen). When the reaction is complete, or essentially so, the polymer is recovered by filtration or decantation and dried. Catalysts, such as p-toluenesulfonic acid, can be used in this procedure. Any catalyst used is removed from the polymer by washing at the end of the reaction.

The anhydride-functionalized polymers modified in accordance with the present process are anhydride-grafted homopolymers of ethylene or anhydride-grafted copolymers of ethylene and higher olefins. Ethylene copolymers can contain up to as much as 40 percent by weight comonomer but more typically will have comonomer contents less than about 25 weight percent. The higher olefin comonomers are most generally $C_{3-8}$ α-olefins. Ethylene homopolymers produced by low pressure methods which are linear high density polyethylene (HDPE) resins or branched low density polyethylene (LDPE) resins produced using high pressure methods provide suitable grafting backbones as do linear low density polyethylenes (LLDPE) obtained by copolymerizing ethylene and α-olefins, such as butene-1 or hexene-1.

Whereas maleic anhydride is preferably grafted onto the above-described ethylene homopolymers and copolymers, other ethylenically unsaturated dicarboxylic acids or anhydrides can also be grafted and the resulting anhydride-functionalized resins modified in accordance with the present process. Other possible grafting monomers include 4-methylcyclohex-4-ene-1,2-dicarboxylic anhydride, bicyclo(2.2.2)oct-5-ene-2,3-dicarboxylic anhydride, bicyclo(2.2.1)hept-5-ene-2,3-dicarboxylic anhydride, tetrahydrophthalic anhydride, norborn-5-ene-2,3-dicarboxylic anhydride, and x-methylbicyclo(2.2.1)hept-5-ene-2,3-dicarboxylic anhydride.

The anhydride-functionalized polymer will contain from about 0.1 to about 5 weight percent of the graft comonomer. More commonly, from about 0.2 up to about 3 weight percent maleic anhydride is grafted on the ethylene homopolymer or copolymer backbone. Grafting is accomplished using conventional procedures known to the art. In general, this involves intimately contacting the polymer and maleic anhydride at an elevated temperature, with our without a solvent and in the absence or presence of a free radical catalyst. The grafting operation can be carried out below or above the melting point of the polymer. Catalysts which may be used include peroxides, hydroperoxides or other free radical initiators. It is possible, however, to produce the grafts in the essential absence of catalysts by conducting the reaction in the melt under high shear. Conventional single or twin screw extruders are widely utilized for this purpose.

The alcohol-modified graft polymers produced in accordance with the invention can be formulated with one or more other polymers to produce adhesive blends which are useful for bonding a variety of substrates. These blends are particularly advantageous as adhesives for bonding EVOH films in multi-layer film applications. Methods for forming the multilayer constructions can be lamination, coextrusion, extrusion lamination, coextrusion coating or any other method known to those skilled in the art for joining dissimilar materials to form composite structures. For example, adhesive blends obtained using the modified anhydride-functionalized products of this invention can be used in composites of EVOH with substrates such as nylon, polyvinyl alcohol (PVA), polyester, polyurethane, LDPE, LLDPE, HDPE, EVA or the like. These composites can be just two layers or they can consist of three or more layers, not including the adhesive tie layer(s). Some examples of useful composites include: polyethylene/adhesive/EVOH, LLDPE/adhesive/EVOH/adhesive/LDPE, EVA/adhesive/ EVOH, EVA/adhesive/EVOH/adhesive/LLDPE, LDPE/adhesive/EVOH/adhesive/paper, nylon/EVOH/adhesive/Al, polyester/adhesive/EVOH, nylon/EVOH/adhesive/EVA.

In formulating the adhesive blends, the alcohol-modified polymers of the invention are combined with one or more ethylene resins selected from the group consisting of ethylene homopolymers, ethylene-olefin copolymers, ethylene-ester copolymers and mixtures thereof. While the resulting adhesive blends may be substantially free of elastomeric materials, one or more of the ethylene polymers may have rubber-like properties. Other elastomeric copolymers not derived from ethylene may also be included in the adhesive blends. Most generally, the adhesive blends will contain from about 0.1 to 30 weight percent of the modified anhydride-functionalized polymer and 70 to 99.9 weight percent of one or more of the ethylene polymers. When other elastomeric materials are present, they will typically be employed in amounts less than 25 weight percent.

Ethylene homopolymers which can be used in the adhesive blends include the same polymers as previously described for the preparation of the grafts. The most common of these include LDPE and HDPE. Ethylene-olefin copolymers will include those wherein the comonomer preferably contains from 3 to 8 carbon atoms. Copolymers of ethylene with propylene, butene-1, hexene-1 and octene-1 are particularly useful and would include LLDPE and EPR (ethylene-propylene rubber).

Ethylene-ester copolymers wherein the ester comonomer corresponds to the general formula

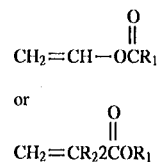

where R is an alkyl group and $R_2$ is hydrogen or methyl are also useful for the formulation of the adhesive blends. Whereas copolymers of ethylene with vinyl acetate and n-butyl acrylate are especially advantageous other useful ethylene-ester copolymers can include those wherein the comonomer is vinyl propionate, vinyl butyrate, vinyl-2-ethylhexanoate, vinyl laurate, methyl acrylate, ethyl acrylate, propyl acrylate, butyl acrylate, 2-ethylhexyl acrylate, lauryl acrylate, methyl methacrylate, ethyl methacrylate, propyl methacrylate, butyl methacrylate, 2-ethylhexyl methacrylate, lauryl methacrylate, and the like.

A variety of other elastomers which are not derived from ethylene may also be included in the adhesive blends. As used herein, the term "elastomer" or "elastomeric" refers to products having rubber-like properties and which have crystallinity contents of less than about 5 percent as measured by x-ray diffraction. Examples of such elastomers include poly(isobutylene), copolymers of isobutylene and isoprene, chlorinated copolymers of isobutylene and isoprene, copolymers of butadiene and styrene, copolymers of isoprene and styrene, block copolymers of butadiene and styrene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, and the like.

In a preferred embodiment of this invention adhesive blends comprised of from 80 to 98 percent EVA or EnBA copolymer and 2 to 20 percent modified anhydride-functionalized polymer are utilized. These are particularly useful for adhering EVOH to other film substrates such as are typically employed in multi-layer barrier film constructions, It is particularly desirable if the EVA or EnBA copolymers employed for these blends contain from about 3 to 30 weight percent of the ester comonomer and the modified anhydride-functionalized polymer is a graft of the HDPE modified with a $C_{2-8}$ aliphatic alcohol. In a highly advantageous embodiment of the invention, the resulting adhesive blends have melt indexes (ASTM D1238) in the range 0.1 up to about 20.

The invention is further described and illustrated by the following examples which are not intended to be limiting. In these examples all parts and percentages are on a weight basis unless otherwise indicated.

The various modified anhydride-functionalized polymers used in the examples were prepared using one of the following methods:

Method A

For this procedure, referred to as the "continuous melt" procedure, the anhydride-functionalized polymer was reacted with the alcohol in a Warner Pfleiderer ZSK-30 twin screw extruder (L/D 30; 9 heating zones Z1-Z9). The extruder had a nitrogen purge at Z1. All of the temperature zones were maintained at 150° C. and the anhydride-functionalized polymer was fed at a rate of 15 pounds per hour with a screw speed of 150 rpm. Alcohol was metered into the extruder through an injection port located in Z3 at the desired rate. The amount of alcohol charged was determined by the degree of reaction desired. A vacuum of 40 mm Hg was applied in Z7 to remove unreacted alcohol. The approximate residence time between Z3 and Z7 was one minute. The extrudate was pelletized.

Method B

For this procedure, referred to as the "batch mixer" procedure, 4 pounds of the anhydride-functionalized polymer in pellet form were charged to a steam-jacketed Henschel Mixer operated at 1250 rpm and heated to 60° C. Depending on the extent of modification desired, an amount of alcohol was added and the temperature increased to 100° C. while maintaining mixing for ten minutes. The mixture was cooled to 60° C. and the pellets were removed.

Method C

For this procedure, referred to as the "batch solution" procedure, 2 pounds of the anhydride-functionalized polymer in pellet form were charged to a 5-liter 3-necked flask containing 2 liters toluene and the desired amount of alcohol. The mixture was heated under nitrogen for four hours at 60° C. with stirring and the modified polymer then recovered by filtration.

With all of the foregoing methods, the reaction was monitored using infrared spectroscopy by following the disappearance of the anhydride peak at 1780 cm$^{-1}$ and the development of the peaks at 1710 cm$^{-1}$ and 1740 cm$^{-1}$ attributable to the acid and ester, respectively. The amount of anhydride converted to half-ester for the final product was calculated using the relative areas of these peaks.

EXAMPLES I–V

Five modified anhydride-functionalized polymers were prepared using different alcohols in accordance with the above-described procedures. The anhydride-functionalized polymer utilized in all of these examples was HDPE (density 0.950; melt index 10) grafted with 2.8 weight percent maleic anhydride. Details for the various reactions are set forth in Table I.

Adhesive blends were prepared using each of the above-prepared modified products I–V and correspondingly labeled Blends I–V. The adhesive blends were prepared by melt blending 6 percent of each of the modified anhydride-functionalized polymer products with 94 percent EVA (melt index 1; 9% VA). Five layer coextruded films of the construction LDPE/adhesive/EVOH/adhesive/LDPE were then prepared using each of the five adhesive blends and evaluated for adhesion and optical properties. Total thickness of the films was 3 mils and the proportion of each layer comprising the film was 25%/20%/10%/20%/25%. The LDPE used had a melt index of 1 and density of 0.925 and the EVOH had a melt index of 1.6 and contained 38 percent ethylene. The coextruded film was produced using three 1 inch diameter extruders (L/D 24). The main extruder was a floor model and the two satellite extruders were of the tilt-and-swing type. A Killion design five layer feed block was used and extrusion dies were the "coat hanger" type having an application width of 8 inches.

TABLE I

| EXAMPLE NO. | ALIPHATIC ALCOHOL | EQUIVALENTS ALCOHOL | MODIFICATION METHOD | ANHYDRIDE CONVERSION (%) |
| --- | --- | --- | --- | --- |
| I | Methanol | 1 | C | 95 |
| II | Ethanol | 1 | A | 84 |
| III | Propanol | 1 | A | 88 |
| IV | Pentanol | 1 | A | 82 |
| V | 2-ethylhexanol |  | B | 80 |

Four comparative adhesive blends were also prepared as follows:

Comparative Blend A

94% EVA/6% unmodified anhydride-functionalized copolymer. The anhydride-functionalized copolymer used was the same as employed for Examples I–V, i.e., 0.95 density, 10 melt index HDPE grafted with 2 percent maleic anhydride.

Comparative Blend B

94% EVA/6% anhydride-functionalized copolymer wherein the anhydride functionality was converted to the diacid by hydrolysis. The anhydride-functionalized copolymer used was the same as employed for Examples I–V.

Comparative Blend C

94% EVA/6% anhydride-functionalized copolymer wherein the anhydride functionality was converted to diester by esterifying using Method C and an equivalents excess of methanol catalyzed with p-toluene sulfonic acid. The anhydride-functionalized copolymer used was the same as employed for Examples I–V.

Comparative Blend D

94% EVA/6% anhydride-functionalized copolymer prepared by directly grafting 4.6 weight percent mono 2-ethylhexyl maleate onto the HDPE (0.950 density; 6.5 melt index).

The EVA copolymer used for all the foregoing comparative adhesive blends was the same as used for the preparation of Blends I–V. Five layer coextruded films were prepared using each of the comparative adhesive blends in accordance with the previously described procedure.

Each of the coextruded films prepared using Blends I–V and Comparative Blends A–D were evaluated for adhesion and optical properties. Adhesion was determined in accordance with ASTM F904. Optical qualities of the films were determined by measuring gloss, haze and transparency. Gloss was determined in accordance with ASTM D2457-70. This provides a measure of the shiny appearance of films. Haze was determined in accordance with ASTM D1003-61 which gives an indication of the close contact clarity of the films. Transparency of the films was determined using ASTM D1746-70 which correlates with the property commonly known as "see-through." It gives an indication of the distortion effect a film will have when viewing relatively distant objects. Higher values indicate better transparency. Test results are set forth in Table II.

It is apparent from the data provided in Table II that while all of the films had comparable adhesion, gloss and haze, the films prepared using the adhesive blends of the invention gave significantly improved transparency.

TABLE II

| BLEND | ADHESION | GLOSS | HAZE | TRANSPARENCY |
|---|---|---|---|---|
| I | 1.2 lb/in | 66 | 7.2 | 18 |
| II | 1.3 lb/in | 73 | 6.1 | 21 |
| III | 1.3 lb/in | 64 | 6.9 | 35 |
| IV | 1.2 lb/in | 66 | 7.5 | 34 |
| V | 1.1 lb/in | 66 | 8.0 | 30 |
| Comp A | 1.2 lb/in | 64 | 8.3 | <10 |
| Comp B | 1.3 lb/in | 62 | 7.3 | <10 |
| Comp C | 0.8 lb/in | 64 | 8.4 | <10 |
| Comp D | 0.5 lb/in | 72 | 6.3 | 11 |

I claim:

1. An adhesive blend consisting essentially of (a) a 0.1 to 30 weight percent modified anhydride-functionalized polyolefin obtained by reacting a high density homopolymer of ethylene or copolymer of ethylene and $C_{3-8}$ alpha olefin having from 0.2 to 3 weight percent maleic anhydride grafted thereon with 0.4 to 1.0 equivalents $C_{2-8}$ aliphatic alcohol to convert at least 80 percent of the anhydride functionality to the corresponding half-ester and (b) 70 to 99.9 weight percent ethylene-ester copolymer selected from the group consisting of ethylene-vinyl acetate copolymer and ethylene-n-butyl acrylate copolymer.

2. The adhesive blend of claim 1 wherein (b) is an ethylene-vinyl acetate copolymer containing from 3 to 30 percent vinyl acetate.

3. The adhesive blend of claim 1 wherein (b) is an ethylene-n-butyl acrylate copolymer containing 3 to 30 percent n-butyl acrylate.

4. The adhesive blend of claim 1 having a melt index from 0.1 up to about 20.

5. The adhesive blend of claim 1 which additionally contains up to 25 weight percent elastomer which is not derived from ethylene.

6. The adhesive blend of claim 1 wherein (a) comprises 2 to 20 weight percent of the blend and (b) comprises 80 to 98 weight percent of the blend.

\* \* \* \* \*